United States Patent [19]

Matsui et al.

[11] Patent Number: 5,054,587
[45] Date of Patent: Oct. 8, 1991

[54] EDDY-CURRENT BRAKE

[75] Inventors: Norio Matsui, Isehara; Isao Sanjo; Shuuichi Chiba, both of Sagamihara, all of Japan

[73] Assignee: Tokyo-Buhin Kogyo Co., Ltd., Kanagawa, Japan

[21] Appl. No.: 545,779

[22] Filed: Jun. 28, 1990

Related U.S. Application Data

[63] Continuation of Ser. No. 295,602, filed as PCT JP88/00346 on Apr. 6, 1988, published as WO88/08635 on Nov. 3, 1988, abandoned.

[30] Foreign Application Priority Data

Apr. 30, 1987 [JP] Japan .................. 62-104451
Sep. 28, 1987 [JP] Japan .................. 62-240640

[51] Int. Cl.$^5$ .................. F16F 15/03; F16D 63/00; H02K 49/04
[52] U.S. Cl. .................. 188/267; 192/84 R; 310/105; 310/216; 310/218
[58] Field of Search ............ 188/164, 267; 192/84 R; 310/105, 216, 218

[56] References Cited

U.S. PATENT DOCUMENTS

| 503,727 | 8/1893 | Richter et al. .................. 188/164 |
| 912,504 | 2/1909 | Steckel et al. .................. 310/105 |
| 2,263,079 | 11/1941 | Flynn .................. 188/218 A |
| 2,617,053 | 11/1952 | Winther .................. 310/105 |
| 2,734,600 | 2/1956 | Strickland, Jr. .................. 188/218 A |
| 2,971,105 | 2/1961 | Jaeschke .................. 310/105 |
| 3,365,598 | 1/1968 | Jaeschke . |
| 4,937,483 | 6/1990 | Matsui et al. .................. 310/105 |

FOREIGN PATENT DOCUMENTS

| 112405 | 2/1940 | Australia . |
| 2103660 | 8/1972 | Fed. Rep. of Germany ...... 188/267 |
| 1296424 | 5/1962 | France .................. 192/84 R |
| 686759 | 3/1965 | Italy .................. 188/164 |
| 48-27148 | 4/1973 | Japan . |
| 50-18131 | 6/1975 | Japan . |
| 50-23091 | 8/1975 | Japan . |
| 56-133963 | 3/1980 | Japan . |
| 56-148170 | 11/1981 | Japan . |
| 433408 | 8/1935 | United Kingdom . |

Primary Examiner—George E. A. Halvosa
Attorney, Agent, or Firm—Flynn, Thiel, Boutell & Tanis

[57] ABSTRACT

The present invention provides an eddy-current brake comprising a rotator made of a ferromagnetic material and electromagnets arranged so that the rotator will intercept the magnetic flux, wherein a braking force is produced by the eddy current generated in the rotator. An Ni-Cu-Ni three-layer thin metallic cladding 30 is provided on the inner surface of the cylindrical peripheral wall portion 11 of the rotator 10, and the coils 45 of the electromanets 40 are enclosed by a magnetic pole case 46 made of a ferromagnetic material, thereby to enable development of a large braking torque. This device is suited for use as an auxiliary brake for vehicles.

9 Claims, 2 Drawing Sheets

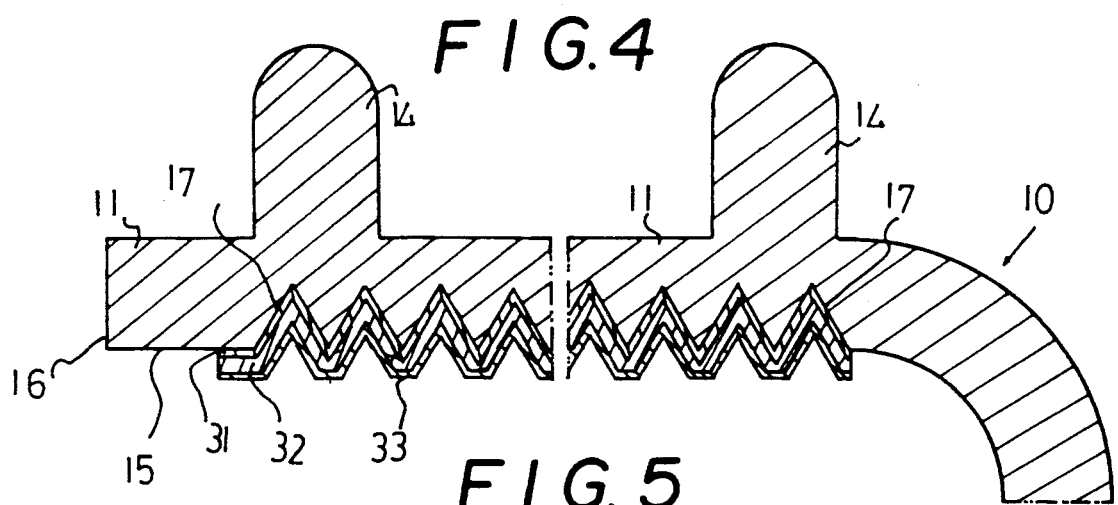
FIG. 4
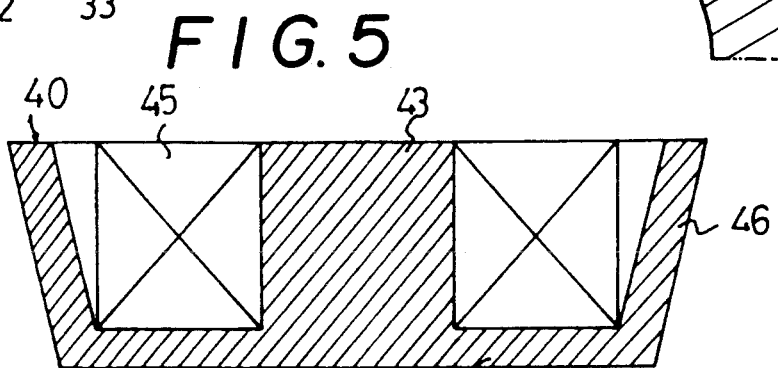
FIG. 5
FIG. 6
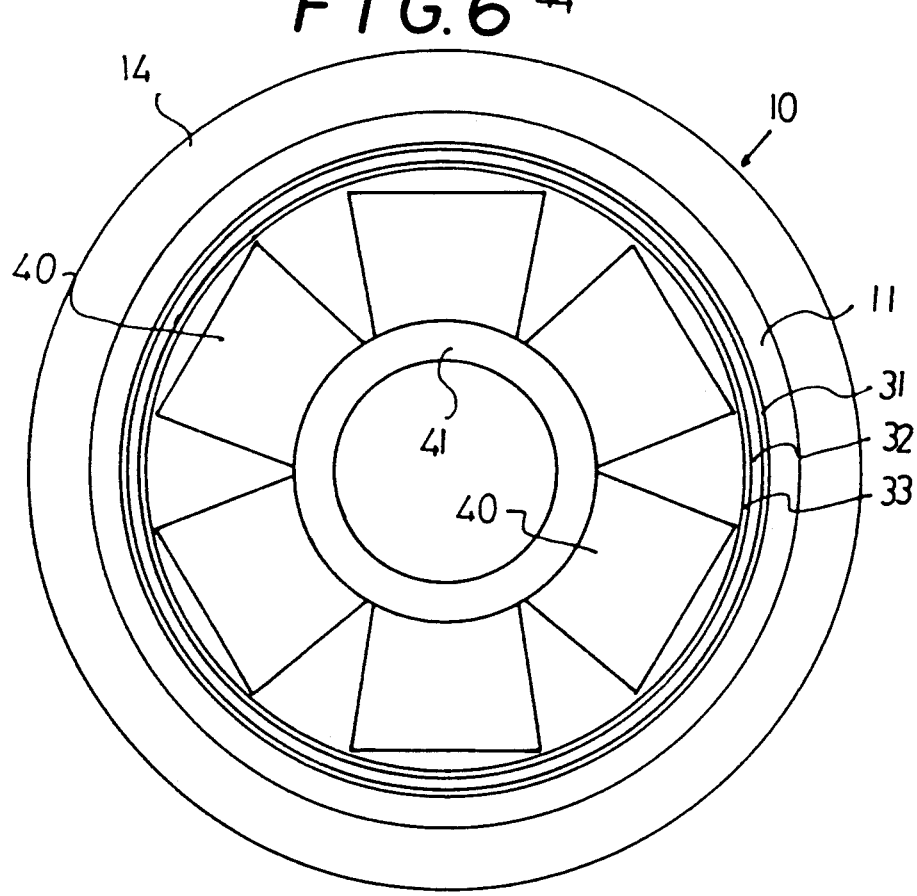

EDDY-CURRENT BRAKE

This application is a continuation of U.S. Ser. No. 07/295,602, filed as PCT JP88/00346 on Apr. 6, 1988, published as WO88/08635 on Nov. 3, 1988, now abandoned.

FIELD OF ART

The present invention relates to an eddy-current braking system comprising a rotator having a three-layer thin metallic cladding on the surface which serves as a magnetic path and electromagnets arranged to increase the strength of magnetic field, wherein a large braking force is produced by the eddy current generated in said rotator.

BACKGROUND ART

The conventional eddy-current brakes have the problem that the weight of the brake per braking torque produced is large in comparison with other types of brake. Generally, eddy-current brakes comprise a rotator made of a ferromagnetic material and electromagnets, which are arranged so that the rotator will intercept the magnetic flux, wherein a braking force is produced by the eddy current generated in the rotator. In such brakes, the smaller the electric resistance of the rotator material, the greater is the braking torque developed if the other conditions, namely electromagnet coil line diameter, number of turns of coil, electric current applied and space between electrode and rotator are the same. It is an essential condition for such brakes that the rotator is made of a ferromagnetic material. Therefore, whatever magnetic material is used, there is produced no remarkable difference in the torque developed. This means that the eddy-current brakes are less suited for producing a large braking torque than the brakes of other systems. An invention which has improved this point and enabled the eddy-current brakes to develop a large braking torque is disclosed in PCT/JP87/00893 applied by the present inventor (which corresponds to U.S. Ser. No. 07/294,568 filed Dec. 16, 1988, now U.S. Pat. No. 4,937,483 issued June 26, 1990). The invention of PCT/JP87/00893 proposes the improvements in which the rotator surface opposing the electromagnet electrodes is clad with a metallic layer composed of a non-magnetic material having a greater electroconductivity than the rotator material to thereby increase the eddy current generated in the rotator while the coils of electromagnets are enclosed by a magnetic pole case made of a ferromagnetic material, and each electromagnet is so designed that its sectional area through which the line of magnetic force of said magnetic pole case passes will be equal to or greater than the cross-sectional area of the magnetic pole so as to shorten the magnetic path of the electromagnet to thereby increase the strength of its magnetic field.

The present invention is intended to provide an eddy-current brake in which further improvements have been made on the metallic layer to increase the eddy current generated in the rotator while enhancing the cooling performance of said metallic layer and also making it peel-resistant.

SUMMARY OF THE INVENTION

The rotator surface opposing the electromagnet electrodes, where the line of magnetic force passes, is provided with an Ni-Cu-Ni three-layer thin metallic cladding. The electric resistance of the nickel (Ni) layer formed immediately on the rotator surface is ½ to ⅓ of that of iron (Fe), so that the eddy current generated the rotator increases 2 to 3 times. The thermal expansivity of nickel is between those of copper (Cu) and iron (Fe). This proves helpful to minimize the relative displacement of the rotator and said metallic cladding due to rise of temperature caused by the eddy current, thus making said cladding proof against exfoliation. The electric resistivity of the copper (Cu) layer clad on the nickel layer is less than 1/10 of that of iron (Fe), which enables 10-fold increase of the eddy current generated in the rotator. The upper nickel (Ni) layer clad on the copper (Cu) layer serves to protect the copper (Cu) layer surface against oxidation when the rotator surface temperature has risen, thereby preventing lowering of heat transfer between said cladding and air due to formation of an oxide film on the copper (Cu) layer surface. This enables maintenance of high cooling efficiency of the thin metallic cladding. It is thus possible to remarkably increase the braking torque produced in the rotator by properly selecting the thickness of the Ni-Cu-Ni three-layer thin metallic cladding.

BRIEF DESCRIPTION OF THE DRAWINGS

FIG. 4 is a partial enlarged longitudinal sectional view of the rotator.

FIG. 5 is a sectional view of an electromagnet.

FIG. 6 is a drawing showing the arrangement of electromagnets.

BEST MODE FOR CARRYING OUT THE INVENTION

Figure 1:
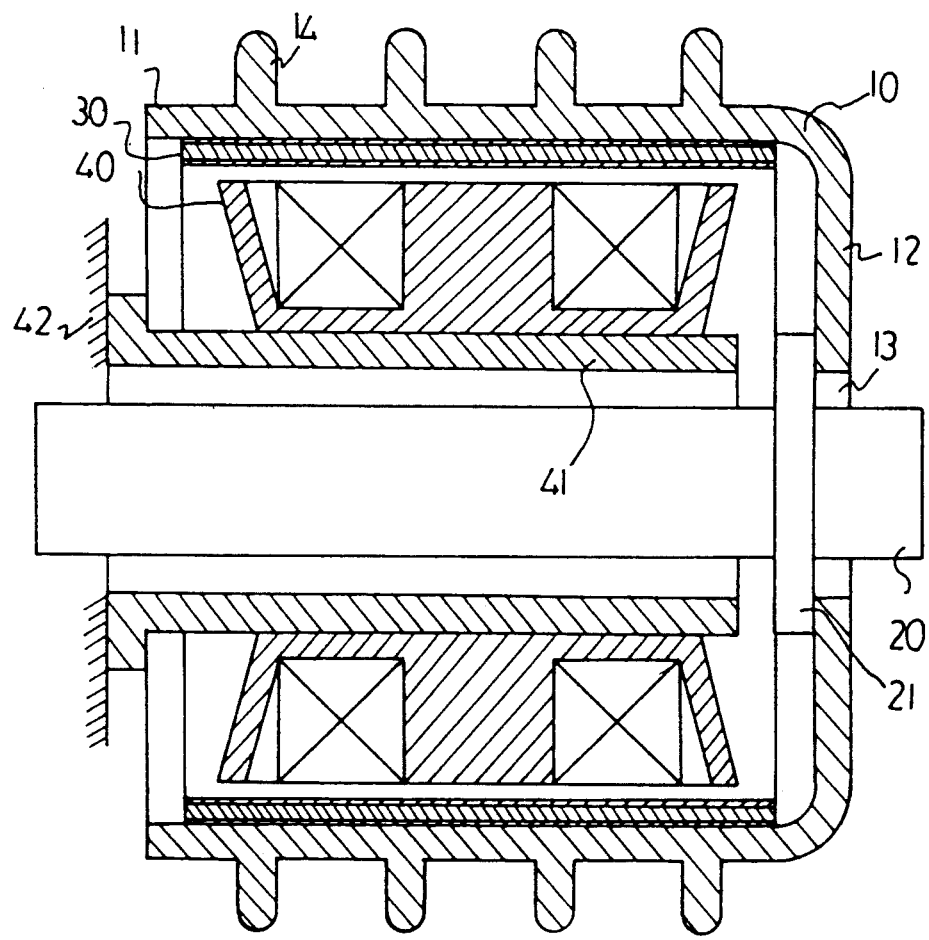
FIG. 1 is a schematic sectional view of the eddy-current brake mechanism according to this invention.
Figure 2:
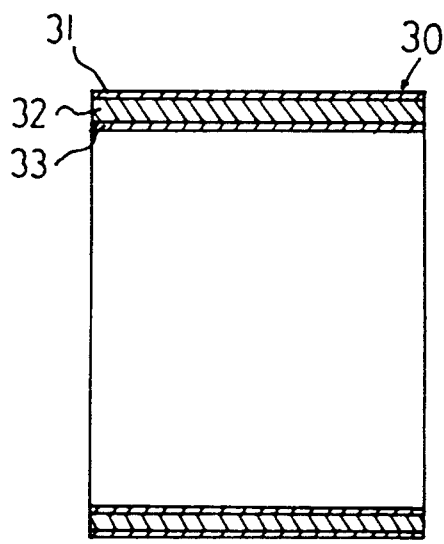
FIG. 2 is an enlarged longitudinal sectional view of the metallic cladding.
Figure 3:
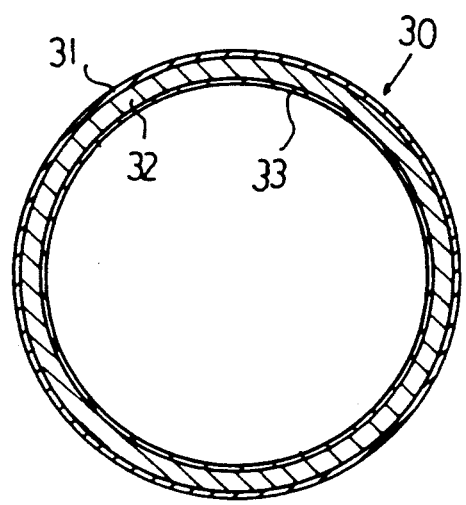
FIG. 3 is an enlarged cross-sectional view of the metallic cladding.

Referring to FIG. 1, the rotator 10 consists of a cylindrical peripheral wall portion 11 extending concentrically with and parallel to the shaft 20 and an end wall portion 12 formed at one of the open ends of said peripheral wall portion 11 so that said end wall portion 12 crosses said shaft 20 at right angles. This end wall portion 12 is provided at its center with a circular opening 13 and detachably secured thereat to a circular flange 21 adapted to be rotatable integrally with the shaft 20 so that the rotator 10 is rotable integrally with said shaft 20. Around the outer surface of said peripheral wall portion 11 are provided the thin-walled ring-shaped fins 14 at a substantially same pitch. These fins 14 are helpful for preventing rise of temperature of the rotator 10. Also, a thin metallic cladding 30 is provided over the entirety of the cylindrical inner surface of said peripheral wall portion 11. This metallic cladding 30, as shown in FIG. 2, consists of a 10–50 μm thick nickel (Ni) layer 31 formed immediately on the inner surface of the Fe-made peripheral wall portion 11, a 0.1–0.2 mm thick copper layer 32 formed on the surface of said nickel (Ni) layer 31 and a 40–60 μm thick nickel (Ni) layer 33 formed on the surface of said copper layer 32. This three-layer cladding can be formed by plating or welding.

FIG. 4 illustrates said three-layer metallic cladding 30 as it was applied to the inner surface of the peripheral wall portion 11 of the rotator 10. The substantially entirety of the inner surface 15 of said peripheral wall portion 11, saving an area of a small length from the open end 16, is threaded to form triangular threads 17, and said Ni-Cu-Ni three-layer thin metallic cladding 30 is formed over the entirety of the inner surface 15 including s id threads 17.

Electromagnets 40 are provided fixedly on the outer suface of a cylindrical fixing plate 41 secured concentrically with the rotator 20. Said fixing plate 41 has one of its cylindrical open ends secured to an immovable brake block 42 so that said fixing plate 41 itself won't rotate and also won't move easily. Said electromagnets 40 are arranged radially about the axis of said fixing plate 41, with two diametrically opposing magnets forming a pair. These electromagnets 40 are also so disposed that the top end face of the magnetic pole 43 of each electromagnet 40 will oppose the metallic cladding 30 of the rotator 10 with a slight space therebetween. Further, the coils 45 of said electromagnets 40 are enclosed by a magnetic pole case 46 made of a ferromagnetic material. Said magnetic pole case 46 is so designed that its sectional area where the line of magnetic force passes will be equal to or greater than the cross-sectional area of the magnetic pole 43. As shown in FIG. 5, the cylindrical magnetic pole case 46 made of a ferromagnetic material is formed integral with a flat bottom plate 44 so that said magnetic pole case 46 projects in the axial direction from the outer edge of said bottom plate 44, and the magnetic pole 43 is formed at the center of said bottom plate 44. Coils 45 are provided on both sides of the magnetic pole 43. Preferably said magnetic pole case 46 is so formed that its size (sectional area) will be the smallest at its end contiguous to the bottom plate 44 and will gradually enlarge toward the top open end so that its sectional are will be the greatest at the top open end.

Industrial Utilizability

The eddy-current brake of this invention is suited for use as auxiliary brake unit for a main brake system in a vehicle.

What is claimed is:

1. An eddy-current brake comprising a rotator and electromagnets arranged so that said rotator will intercept the magnetic flux of said electromagnets, wherein a braking torque is produced by an eddy current generated in said rotator, said rotator having a peripheral wall portion extending parallel to and concentrically with a drive shaft; wherein a three-layer thin metallic cladding made entirely of magnetic materials is formed over the entirety of an inner surface of said peripheral wall portion, said cladding including an inner nickel layer on said inner surface and having a thickness in the range of 10-50 $\mu$m, a copper layer provided on said inner nickel layer and having a thickness in the range of 0.1-0.2 mm, and an outer nickel layer provided on said copper layer and having a thickness in the range of 40-60 $\mu$m; wherein said inner surface of said peripheral wall portion has triangular threads, said metallic cladding being provided on said threads; wherein an outer surface of said peripheral wall portion has a plurality of axially spaced, circumferentially extending ribs; including a stationary brake block disposed within said peripheral wall portion, said electromagnets being supported on said brake block at circumferentially spaced locations; wherein each of said electromagnets includes a pole case which is made of a ferromagnetic material and has a flat bottom plate secured to said brake block, a side wall projecting away from said brake block from peripheral edges of said bottom plate and having a surface facing and adjacent said cladding, and a magnetic pole projecting away from said brake block from a central portion of said bottom plate and having a surface facing and adjacent said cladding, and includes a coil extending around said pole within said side wall; and wherein said surface on said side wall has an area at least as large as the area of said surface on said pole where lines of magnetic force pass.

2. An eddy-current brake, comprising an electromagnet and a member which has thereon a surface and which is supported for movement relative to said electromagnet so that said surface moves past said electromagnet while remaining adjacent thereto with an air gap of a predetermined size therebetween, whereby an eddy current is generated in said member and produces a braking torque between said member and said electromagnet, wherein said member includes a wall portion having on a side thereof facing said electromagnetic and three-layer cladding, and including means for facilitating a magnetic gap between said electromagnet and said member which is equal in size to said predetermined size of said air gap in order to maximize said braking torque for said predetermined size of said air gap, said means including said cladding being made entirely from magnetic materials, said cladding including a first layer of nickel provided on said wall portion and having a thickness in the range of 10-50 $\mu$m, a second layer of copper provided on said first layer and having a thickness in the range of 0.1-0.2 mm, and a third layer of nickel provided on said second layer and having a thickness in the range of 40-60 $\mu$m, said surface of said member being provided on a side of said third layer remote from said second layer.

3. An eddy-current brake, comprising an electromagnet and a member which has thereon a surface and which is supported for movement relative to said electromagnet so that said surface moves past said electromagnet while remaining adjacent thereto, whereby an eddy current is generated in said member and produces a braking torque between said member and said electromagnet; wherein said electromagnet includes: a magnetic pole having a surface facing and adjacent said surface of said member; a magnetic side wall extending around said pole and having a surface facing and adjacent said surface of said member; and a coil extending around said pole within said side wall; wherein said surface on said side wall has an area at least as large as the area of said surface on said pole; and wherein said member includes a wall portion having on a side thereof facing said electromagnet a three-layer thin metallic cladding, said cladding including a first layer of Ni provided on said wall portion, a second layer of Cu provided on said first layer, and a third layer of Ni provided on said second layer, said surface of said member being a surface provided on a side of said third layer remote from said second layer.

4. The eddy-current brake according to claim 3, wherein of the three layers of said metallic cladding, said nickel first layer formed immediately on an inner surface of said wall portion of said member is the smallest in thickness, said copper second layer is the largest in thickness, and said nickel third layer is smaller than said copper second layer and equal to or greater than said nickel first layer in thickness.

5. The eddy-current brake according to claim 4, wherein said nickel first layer has a thickness in the range of 10-50 $\mu$m, said copper second layer has a thickness in the range of 0.1-0.2 mm, and said nickel third layer has a thickness in the range of 40-60 $\mu$m.

6. The eddy-current brake according to claim 3, wherein said side of said wall portion has triangular threads, said metallic cladding being provided on said threads.

7. The eddy-current brake according to claim 3, wherein said relative movement of said member and said electromagnet is rotational movement about an axis of rotation, wherein said wall portion is substantially cylindrical and is concentric to said axis of rotation, and including a plurality of axially spaced, circumferentially extending ribs provided on an outer surface of said wall portion.

8. The eddy-current brake according to claim 3, wherein said relative movement of said member and said electromagnet is rotational movement about an axis of rotation, wherein said wall portion is substantially cylindrical and is concentric to said axis of rotation including a plurality of further electromagnets, and including a stationary brake block disposed within said wall portion, said electromagnets being supported on said brake block at circumferentially spaced locations.

9. The eddy-current brake according to claim 8 wherein each of said electromagnets includes a pole case which is made of a ferromagnetic material and includes said pole and said side wall, said pole case including a flat bottom plate secured to said brake block, said side wall projecting away from said brake block from peripheral edges of said bottom plate, and said magnetic pole projecting away from said brake block from a central portion of said bottom plate.

* * * * *

UNITED STATES PATENT AND TRADEMARK OFFICE
CERTIFICATE OF CORRECTION

PATENT NO. : 5 054 587
DATED : October 8, 1991
INVENTOR(S) : Norio MATSUI et al

It is certified that error appears in the above-identified patent and that said Letters Patent is hereby corrected as shown below:

Column 4, line 17; replace "and" with ---a---.

Signed and Sealed this

Sixth Day of April, 1993

Attest:

STEPHEN G. KUNIN

Attesting Officer

Acting Commissioner of Patents and Trademarks